United States Patent
Towfiq et al.

(10) Patent No.: US 10,901,192 B2
(45) Date of Patent: Jan. 26, 2021

(54) INTERFEROMETRIC SYSTEM WITH MOTION MECHANISM FOR INSPECTING MULTI-CHANNEL FIBER OPTIC CONNECTORS

(71) Applicant: Sumix Corporation, Oceanside, CA (US)

(72) Inventors: Farhad Towfiq, Oceanside, CA (US); Andrii Fesenko, Kyiv (UA); Oleksander Makeiev, Kyiv (UA)

(73) Assignee: SUMIX CORPORATION, Oceanside, CA (US)

( * ) Notice: Subject to any disclaimer, the term of this patent is extended or adjusted under 35 U.S.C. 154(b) by 0 days.

(21) Appl. No.: 16/232,791

(22) Filed: Dec. 26, 2018

(65) Prior Publication Data

US 2020/0209601 A1 Jul. 2, 2020

(51) Int. Cl.
*G01B 11/24* (2006.01)
*G02B 21/00* (2006.01)
*G02B 6/38* (2006.01)
*G01N 21/952* (2006.01)

(52) U.S. Cl.
CPC ...... *G02B 21/0016* (2013.01); *G01B 11/2441* (2013.01); *G02B 6/385* (2013.01); *G02B 6/3885* (2013.01); *B08B 2240/02* (2013.01); *G01N 21/952* (2013.01)

(58) Field of Classification Search
CPC .. G01M 11/30; G01M 11/31; G01M 11/3154; G01N 21/00
See application file for complete search history.

(56) References Cited

U.S. PATENT DOCUMENTS

| | | | |
|---|---|---|---|
| 5,459,564 A * | 10/1995 | Chivers | G01B 9/04 356/477 |
| 6,178,285 B1 * | 1/2001 | Csipkes | G01M 11/088 385/133 |
| 6,215,555 B1 * | 4/2001 | Chivers | G02B 6/3833 356/511 |
| 7,312,859 B2 | 12/2007 | Koudelka et al. | |
| 9,110,252 B2 | 8/2015 | Zhou et al. | |
| 9,733,616 B2 | 8/2017 | Ruchet et al. | |
| 2008/0304051 A1 * | 12/2008 | Wells | G01M 11/31 356/73.1 |
| 2014/0268114 A1 * | 9/2014 | Zhou | B08B 5/02 356/73.1 |

* cited by examiner

*Primary Examiner* — Jonathan M Hansen
(74) *Attorney, Agent, or Firm* — Loza & Loza, LLP; Heidi L. Eisenhut

(57) ABSTRACT

A lightweight miniature interferometric device for interferometric inspection of circular multi-channel fiber optic connectors that includes the interferometric microscope, holding fixture, multi-axis motion mechanism and computing device. The system performs an interferometric inspection of multi-channel fiber optic connector. The method of interferometric inspection provides automatic scan of the multi-channel fiber optic connector, reconstructing 3D surfaces of fiber optic termini of the connector and analyzing its parameters. The system connects to the connector by holding fixture and performs an interferometric inspection of each fiber optic terminus of the connector by means of multi-axis motion mechanism.

11 Claims, 7 Drawing Sheets

INTERFEROMETRIC SYSTEM WITH MOTION MECHANISM FOR INSPECTING MULTI-CHANNEL FIBER OPTIC CONNECTORS

BACKGROUND

Field

The present disclosure generally relates to an inspection apparatus for inspecting end-face geometries of fiber optic connectors, and more particularly to a miniature lightweight interferometric microscope inspection apparatus with a motion mechanism for precise positioning and inspection of multi-channel fiber optic connectors.

Introduction

Typically end faces of fiber optic termini must satisfy criteria for effective optic fiber mating as required by certain industry standards, such as MIL-C-28876 or MIL-DTL-38999 as examples. Such standards relate to rugged military and industrial multi-channel fiber optic connectors for deployable, shipboard, outdoor, and fixed communication system requirements. These connectors are designed to provide the best possible optical performance in applications with extremely severe environmental conditions. Applications for these connectors includes defense (military aircraft, military communication systems, hand held and vehicle platforms, military ground support systems, military computer systems, harsh environment platforms, blind mate applications, high density, low signal platforms, unmanned systems) and aerospace (aircraft engines, general electric testing equipment, commercial business aviation, and aerospace launch vehicles).

Concerning the inspection of such connectors, the optic fiber as well as the connector ferrule must be clean and their surface geometry must provide for good physical contact and low signal loss. Interferometric devices are used to inspect the end face (e.g., the optic fiber and ferrule) in order to determine whether the connector will be able to deliver the requisite high performance by detecting scratches, damage, and other surface defects of an end face of a fiber optic terminus, as well as the optic fiber's radius, apex offset, and height. Interferometric inspection may also be used to detect particles, stains, and other contaminations.

Moreover, it noted that existing interferometers are generally not applicable for the above-described connectors (e.g., standards MIL-C-28876 or MIL-DTL-38999, and the like) because of the large sizes of such connectors and their specific form factor. Known interferometers for optic fiber inspection are generally unable to cover all fiber optic termini in the connector. For example, standard single-fiber connectors (SC, ST, LC etc.) generally require from about 0.4-2 mm in diameter for the field of view of an inspecting device, and multi-fiber connectors (MT, MPO etc.) may require up to 6 mm. In contrast, the above-described circular multi-channel fiber optic connectors may require up to a 25 mm field of view to accomplish the simultaneous scan of all fibers. Additionally, known inspection systems (e.g., U.S. Pat. Nos. 7,312,859 and 9,733,616) feature designs to prevent any off-axis movement of an optical imaging system. Other known systems (e.g., U.S. Pat. No. 9,110,252) include an optical microscope with a shifting mechanism for inspecting individual optic fibers of a fiber optic connector. Such systems do not, however, provide for interferometric inspection, and the known shifting mechanisms are manually controlled and require continuous and time-consuming user involvement in the process.

In light of the conditions and connector types discussed above and the presently known systems, however, interferometric inspection with traditional apparatus becomes difficult and, thus, a lightweight, portable device for interferometric inspection that further allows for automatic repositioning of the imaging system becomes more desirable.

SUMMARY

According to particular aspects of the present disclosure, a lightweight miniature interferometric device with a multi-axis position mechanism is disclosed. The device includes an interferometric microscope or interferometer, a holding fixture for connecting the interferometer to a multi-channel fiber optic connector, either a 3-axis or 2-axis positioning (motion) mechanism for precise alignment of the interferometric microscope or interferometer with a connector end face, and a computing device for managing automatic interferometric inspection of the connector.

The interferometer disclosed herein includes a light source, a beam splitter, a reference mirror, various lenses, and a digital image capture device (e.g., a digital camera) for capturing interferometric patterns.

The system performs an interferometric inspection of a fiber optic connector including measurement of each fiber of an optic terminus of the connector one at a time, or more than one at a time if the field of view (FOV) of the interferometer is large enough.

The presently disclosed system connects to the connector and performs an interferometric measurement of each fiber optic terminus end face of the connector by means of multi-axis motion mechanism. The motion mechanism provides high precision alignment of the first fiber optic terminus end face and the FOV of the interferometer by moving the interferometric system along a plane parallel to the end face of the connector. The interferometric measurement includes obtaining a series of interference patterns for the fiber optic terminus surface by precisely moving the interferometric system along its optical axis. Further, the disclosed motion mechanism moves and provides alignment of subsequent fiber optic termini end faces and the FOV of the interferometer and performs the interferometric measurement. This process applies for one or more fiber optic termini of the connector depending number of fibers in the connector or particular desired inspection requirements.

Analysis of obtained interference patterns may include the reconstruction of the 3D surface of one or more fiber optic termini of the connector and its geometry. Additionally such reconstruction provides high accuracy detection of particles, stains, and other contaminations that might potentially obstruct physical contact of the connector when mated.

BRIEF DESCRIPTION OF THE DRAWINGS

The features, nature, and advantages of the present disclosure will become more apparent from the detailed description set forth below when taken in conjunction with the drawings in which like reference characters identify the same corresponding features throughout and wherein.

DETAILED DESCRIPTION

Figure 1:
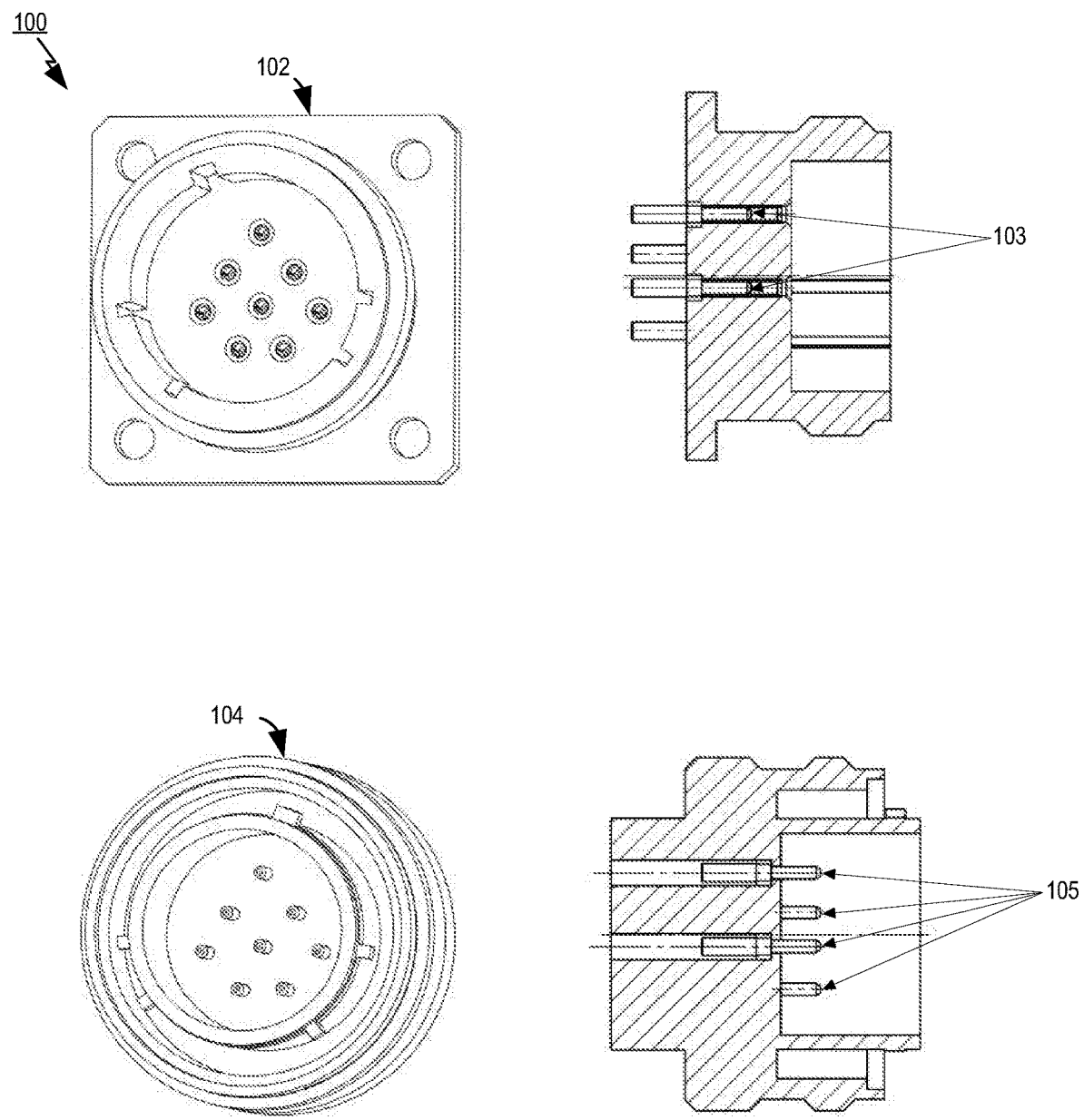
FIG. 1 illustrates an example of a circular multi-channel fiber optic connector constructed according to known standards.

The present disclosure provides a lightweight miniature interferometric system with a multi-axis motion mechanism for repositioning the optical system of the interferometer for inspection of the surface and geometry (e.g., a radius of curvature, an apex offset, a fiber height etc.) of one or more fiber optic termini of a multi-channel fiber optic connector. An advantage of the presently disclosed system is the ability to connect an interferometric microscope to the multi-channel fiber optic connector and provide either automatic or manual inspection of the connector. The system further affords the interferometric inspection of one or more end faces of fiber optic termini by their alignment with a field of view (FOV) of the interferometer either on a singular basis or inspection of multiple end faces at one time if the FOV is large enough. Small overall dimensions and weight of the interferometer provides for interferometric inspection of the optic connectors in areas or locations with limited space such as aircrafts, ships, different vehicle platforms, and others. The system further provides for in situ interferometric inspection of the optic connectors on patch-panels, server boxes, and other optical-network devices, as examples.

With respect to the various figures used to illustrates the presently disclosed systems, it in noted that some mechanical and optical elements may be omitted in the figures in order to better emphasize inventive aspects of the illustrative embodiments. Furthermore, it is noted for purposes of the present application that the interferometric inspection of a connector disclosed herein may include one or more of interferometric inspection of the connector's fiber optic termini, reconstruction of one or more of an optic fiber's and a ferrule's surfaces and calculating the parameters of the connectors including a ferrule radius of curvature, a fiber apex offset, and a fiber height, as examples of parameters described at International Standards IEC 61300-3-30, IEC 61300-3-47 etc. The term "interferometric inspection or scan of the fiber" may mean the interferometric inspection of both the fiber and its ferrule. It is noted here a ferrule end face radius of curvature is defined as the radius of curvature of the portion of the ferrule end face that domed (i.e., has convexity) configured for physical contact. Additionally, the term "apex offset" is defined as the distance between the axis of the ferrule and a line parallel to the axis that passes through the vertex (i.e., the highest point on the dome) formed by spherically polishing the ferrule. Furthermore, the fiber height of a spherically polished ferrule is defined as the average distance between the fiber end face and a virtual spherical surface that is fitted to the spherically polished ferrule end face.

The interferometric inspection utilized herein also provides for the detection of particles, stains, and other surface anomalies of the fiber optic termini, and the calculation of the size and height values of such anomalies in order to check or compare such values against optical interface requirements specified for proper physical contact and efficient propagation and reception of optical signals.

Turning to the figures, FIG. 1 illustrates an example 100 of known circular multi-channel fiber optic connectors to which the present inspection systems may be applied. The female connector 102 and the male connector 104 shown in FIG. 1 are illustrative of optical connectors specified by the MIL-C-28876 or MIL-DTL-38999 specifications, in particular, but the invention is not necessarily limited to inspection of these types of connectors. Such specifications cover circular, plug and receptacle style, multiple removable termini, and fiber optic connectors that are compatible with multiple transmission element cables, as examples. For purposes of the present disclosure, the fiber optic connectors that may be examined with the apparatus herein cover general purpose, interconnection hardware providing a variety of compatible optical coupling arrangements. Plug and receptacle styles that are contemplated as being usable with the present invention include straight, wall mounted, jam nut mounted, right angle, and other connector configurations as required for cable system applications. Hardware associated with the connectors may include connector back shells and protective covers. As further illustrated in FIG. 1, examples of particular objects within the connectors that may be specifically inspected include a plurality of fiber optic termini end faces 103 of the female connector 102 (as shown by a cross-sectional side view of the female connector) and a plurality of fiber optic termini end faces 105 of the male connector 104 (as shown by a cross-sectional side view of the female connector.

Figure 2:
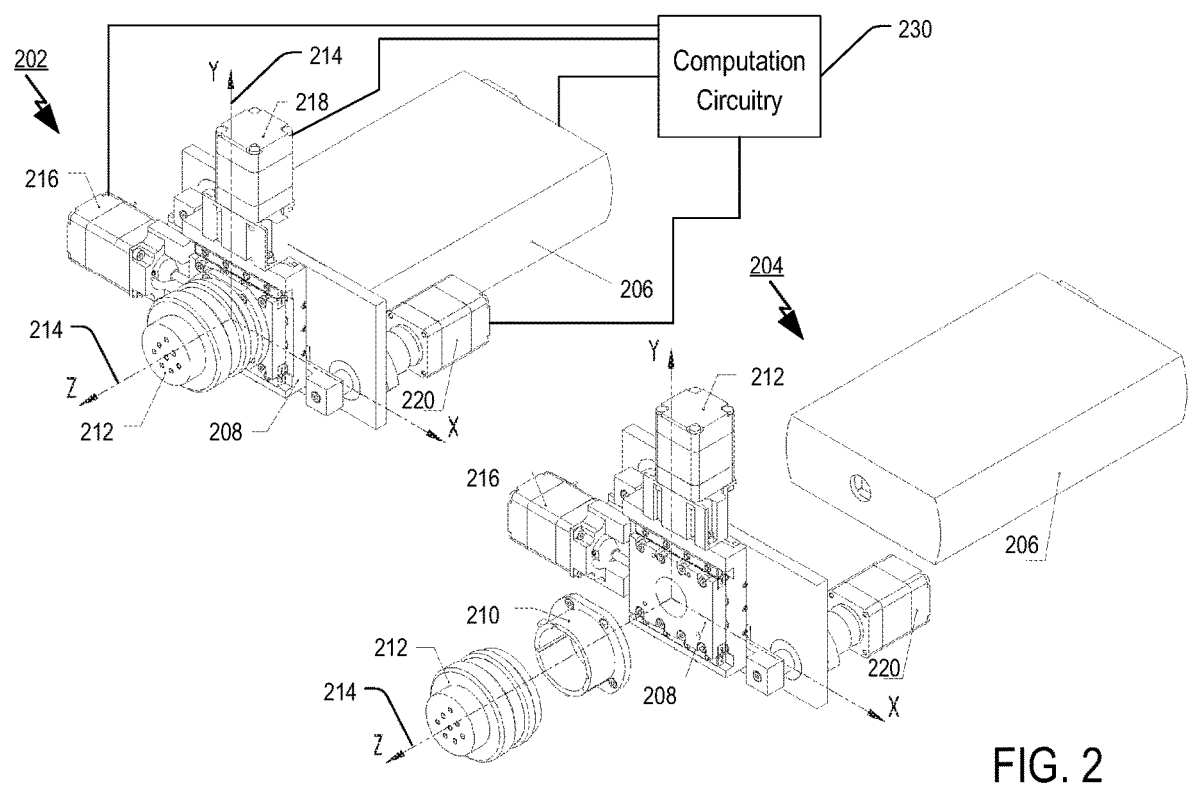
FIG. 2 illustrates both a general isometric view and an exploded isometric view of an example of the presently disclosed interferometric inspection system.

FIG. 2 illustrates an isometric view 202 of an inspection apparatus 200, as well as an isometric exploded view 204 of the apparatus 200. In this example, the apparatus 200 includes an interferometer 206 configured without a focusing system, a 3-axis motion mechanism 208 (i.e., a motion mechanism capable of being moved in one or more of the x, y, and z axes), a detachable or removable holding fixture 210, and a multi-channel fiber optic connector 212, which is the connector to be inspected and is not necessarily to be construed as part of apparatus 200.

It is noted that the translation of the rotational motion of the motors into linear motion to drive the motion mechanism 208 in the three Cartesian coordinate directions may be implemented through any of a variety of known mechanisms for such translation. For example, the translation may be effected using various mechanisms such as rack and pinion gearing; lead screws; a slider-crank mechanism; a plate, cylindrical, or linear cam drive with a fixed-axis follower; chain, belt, or cable drives, as well as any combinations of these mechanisms, although those skilled in the art will appreciate that the invention is not merely limited to such. Additionally in an aspect of the 3-axis motion mechanism shown in the example of FIG. 2, the mechanism may comprise three linear screw drive actuators with stepper motors that effectuate linear motion of the interferometer with respect to the attached connector along the three axes independently.

An optical axis of the interferometer (not shown) is aligned with (e.g., is equal to by matching exactly in three dimensional space) a system coordinate axis Z shown by line 214. The interferometric inspection system 200 shown in FIG. 2 is configured to perform an automatic scan of the fiber optic termini end faces in the circular multi-channel fiber optic connector 212 and garner information about the fiber optic termini end face surface, such as the end faces 103 or 105 as shown in FIG. 1.

FIG. 2 also illustrates that the system 200 includes motive engines 216, 218, and 220, each of which may be implemented by a motor such as stepper motor in one example. Each motive engine 216, 218, 220 is configured to move the 3-axis motion mechanism 208 in respective directions along the X, Y, and Z axes, respectively. When the system 200 is fixed in place, the holding fixture 210 coupled to the connector 212 is fixed to the 3-axis motion mechanism 208, and the motive engines 216, 218, and 220 serve to align the optical axis 214 of the interferometer with a particular fiber in the connector 212, which will be described in more detail later. Additionally, the 3-axis motion mechanism 208 may effectuate focusing of the interferometer 206 on the end face of the particular fiber under investigation, such as through the engine 220 moving the mechanism 208 in the direction of the Z (i.e., optical axis 214).

The system 200 further includes a computation circuitry 230 which is communicatively coupled to the interferometer 206 and receives interferometric data therefrom, such as digital images of interference patterns and the like. In turn, circuitry 230 processes such data for further processing and analysis in determining the quality of the connector 210 and the fiber optic termini therein. Furthermore, the circuitry may also be configured to control each of the motive engines 216, 218, and 220 for moving and positioning the 3-axis motion mechanism 208. The positioning of the mechanism 208 may be based on the information received from the interferometer 206 or, alternatively, independent thereof.

Figure 3:
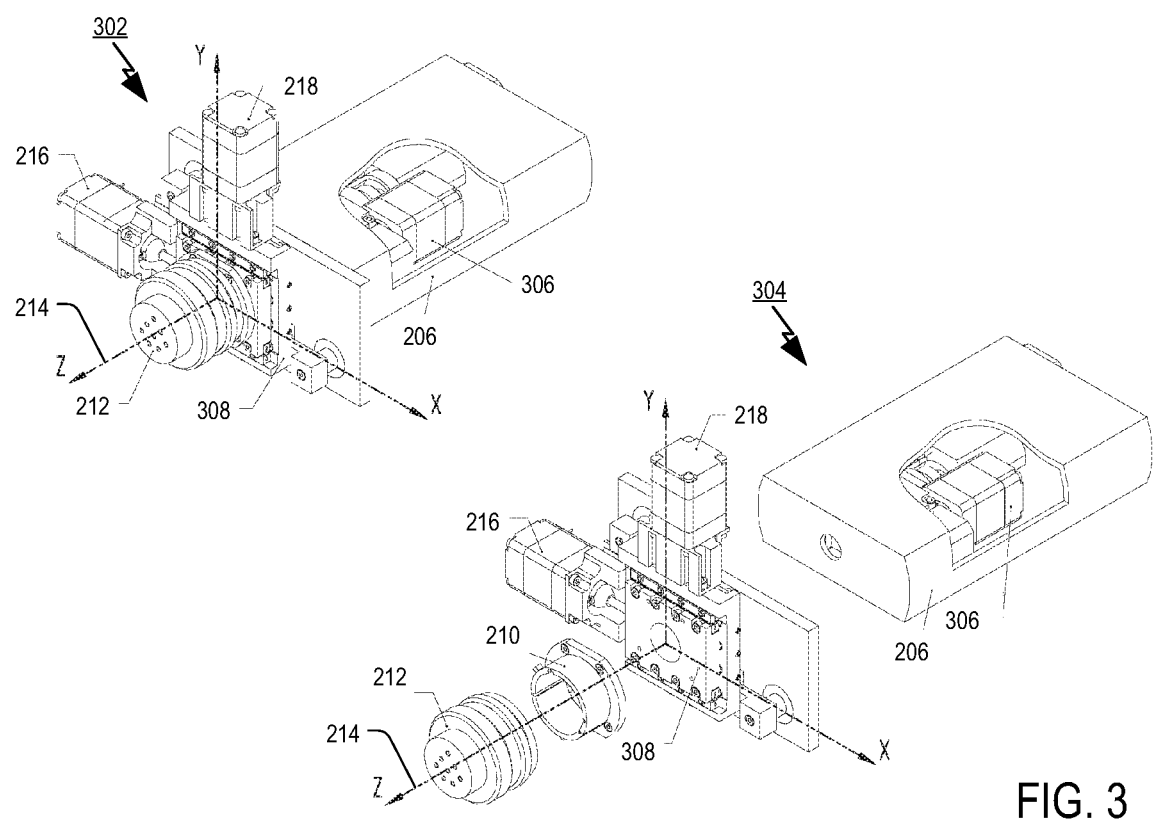
FIG. 3 illustrates a general isometric view and an exploded isometric view of another example of the presently disclosed interferometric inspection system.

FIG. 3 illustrates another exemplary system 300 of the disclosed interferometric systems where the interferometer 206 includes a motive engine 306 within the interferometer 206 to achieve focusing rather than the external motive engine 220 illustrated in FIG. 2. In this illustration, which is similar to FIG. 2 and has like components labeled with the same reference numbers, both an isometric view 302 and an exploded isometric view 304 of the system 300 are illustrated. In the system 300, the example, a motion mechanism 308 may constitute a 2-axis motion mechanism, which includes motive engines 216 and 218 for moving the mechanism in the respective X and Y axis directions. In one aspect engines 216, 218, and 220 may be implemented with stepper motor drives. In another aspect, engines 216 and 218 may be implemented with stepper motor drives and engine 220 as in FIG. 2 or engine 306 as in FIG. 3 may be implemented with a piezoelectric drive.

In another embodiment the motion mechanism 208 is a 2-axis positioning mechanism for precise alignment of the interferometer 206 with the fiber end face of the connector 212. The alignment implemented by engines 216 and 218, which move the interferometer 206 along the X-Y plane perpendicular to the optic axis 214. The focusing of the interferometer 206 then is provided by the motive drive 306, whether within the interferometer as in FIG. 3 or external motive drive 220 as in FIG. 2.

In yet other aspects, it is noted that the holding fixture or mechanism 210 is configured for removably connecting a multi-channel fiber optic connector to the system 200. The holding fixture or mechanism 210 may be configured as a replaceable part of the interferometric system 200 and dimensioned appropriately to meet the mount requirements of the connector 212 to be inspected. Accordingly, the holding fixture or mechanism 210 may be configured according to any of a number of different types of connectors such that these various connector types may be removably fixed to the motion mechanism 208. In another alternate embodiment the holding fixture or mechanism 210 may be fixed attached to the motion mechanism 208 and, thus, not removable, such as in cases where it may be necessary to increase the mechanical strength of the system to ensure accuracy of the interferometric measurements.

Figure 4:
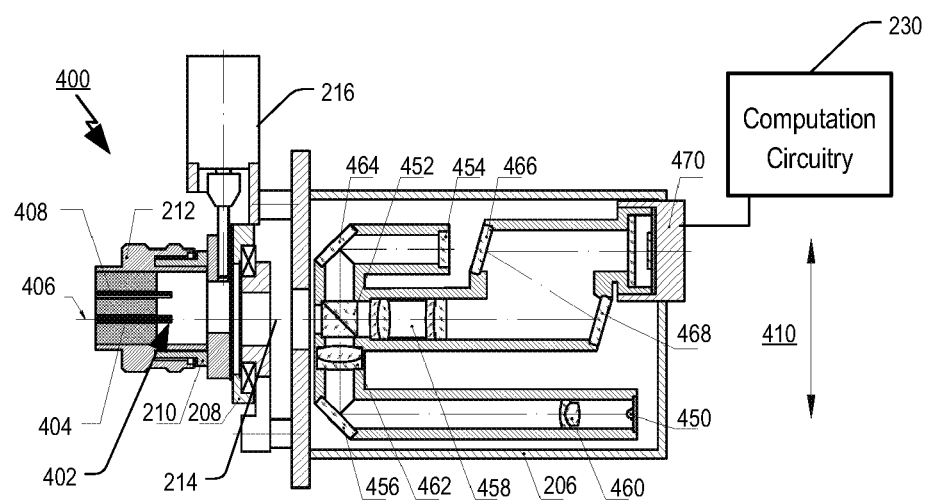
FIG. 4 illustrates a cross-sectional view in the X-Z plane of the exemplary interferometric inspection system illustrated in FIG. 2 in a first position.

FIG. 4 illustrates a cross-sectional view in the X-Z plane of the exemplary interferometric inspection system illustrated in FIG. 2 in a first position where the interferometer 206 is aligned with a particular optic fiber in the connector 212. As may be seen in FIG. 4, an optical axis 214 of the interferometer 206 is aligned with the end face 402 of a first fiber 404 within the connector 212. This alignment is effectuated at least in part by the motion mechanism 208, which is positioned by the motive engines 216, 218, and 220, of which only engine 216 is visible in the cross-section view in FIG. 4, and circuitry 230 (shown in FIG. 4 only for sake of example, and to be understood that such circuitry 230 is included with the examples of FIGS. 3, 6, and 7 but omitted from illustration for sake of brevity).

It is noted that in the particular example of FIG. 4, the alignment of the optical axis 214 of the interferometer 206 with the end face center 402 includes linearly moving the interferometer 206 along the X axis (shown by arrow 410) and the Y axis (not shown in FIG. 4, but illustrated in the cross-sectional views in FIGS. 6 and 7) where X-Y plane is perpendicular to the optical axis 214 of the interferometer 206. Reference number 406 represents the projection of the optical axis 214 on X-Z plane. When performing an interferometric scan of the end face, this scan produces a series of the interference patterns by focusing the optical system of the interferometer on the end face surface 402 of the first fiber 404, which are output to the computation circuitry 230 as will be described in more detail later. It is noted here that the focusing of the optical system may be performed through the use of motive driver 220 in the example of FIG. 2 or, alternatively, through motive driver 306 in the example of FIG. 3.

When the interferometric scan of the first end face 402 is finished, the motion mechanism 208 (including the motive drivers 216, 218, and 220 as well as the computation circuitry 230) is capable of being moved or relatively positioned such that the optical axis 214 of the interferometer 206 is centered on another fiber for analysis or inspection, such as fiber 408 as may be seen in FIG. 5, which will be discussed below. The process of moving the interferometer 206 with respect to the various fibers in the connector 212 is repeated until all fibers that are desired to be analyzed or inspected have been scanned.

Figure 5:
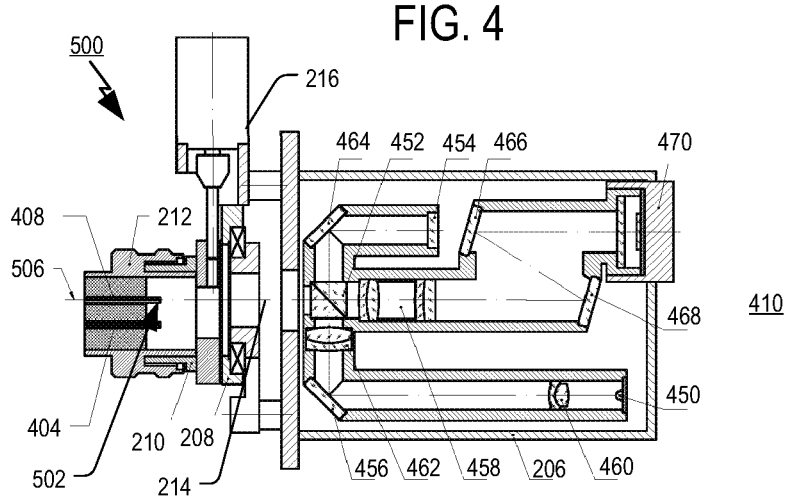
FIG. 5 is another cross-sectional view in the X-Z plane of the exemplary interferometric inspection system illustrated in FIG. 2 in a second position.

FIG. 5 illustrates another cross-sectional view 500 in the X-Z plane of the exemplary interferometric inspection system 200 illustrated in FIG. 2, where the system has been moved to another position to examine a second optic fiber 408. In this case, the optical axis 214 of the interferometer 206 is aligned with an axis 506 of the second fiber 408 to examine the end face 502 of the fiber 408.

According to another aspect, it is noted that the interferometer 206 utilized in systems 200 or 300 may be implemented by an interferometric microscope utilizing an optic magnification scheme and a standard Michelson interferometer configuration. As may be seen in the cross-sectional views of FIGS. 4 and 5, as well as FIGS. 6-8, the interferometer 206 may include a light source 450, a beam splitter 452, a reference mirror 454, various lenses 458, 460, 462, mirrors 456, 464, 466, 468, and a digital camera 470 for capturing interferometric patterns. Further details of this optical system will be discussed later with regard to FIG. 8.

Of further note, the computation circuitry 230 may be configured to effectuate automatic scanning of the multi-channel fiber optic connector 212. In particular, the computation circuitry 230 controls the motion mechanism 208, as well as motive drivers 216, 218, and 220 for positioning the interferometer 206 in alignment with each fiber optic termini end face of the connector 212 that are desired to be inspected. When the interferometer 206 obtains a magnified image of the fiber optic terminus, the interferometric scan will be executed. In an aspect, a portion of the connector to be inspected or studied will be a fiber/ferrule end face having a diameter of approximately 50-250 μm. Accordingly, magnification is needed to obtain an appropriate resolution of the fiber/ferrule end face image as well as an image of interferometric patterns. The automatic scanning process may be configured to then repeat interferometric scanning by positioning the motion mechanism 208 to obtain a scan of each fiber until finished. The instructions may be known a priori, predetermined, preprogrammed, or remotely programmable in various aspects. In another aspect, the scanning may be based on the analysis of the interferometric information obtained by the computation circuitry 230, such as whether scanning needs to be repeated or for rechecking particular fibers in the connector as examples. In other aspects, the computation circuitry 230 may be located within the interferometer 206 or situated outside of the interferometer 206 as illustrated. In yet another aspect, the computation circuitry 230 may also be configured with a user interface (not shown) that allows manual operation of the scanning processes.

Figure 6:
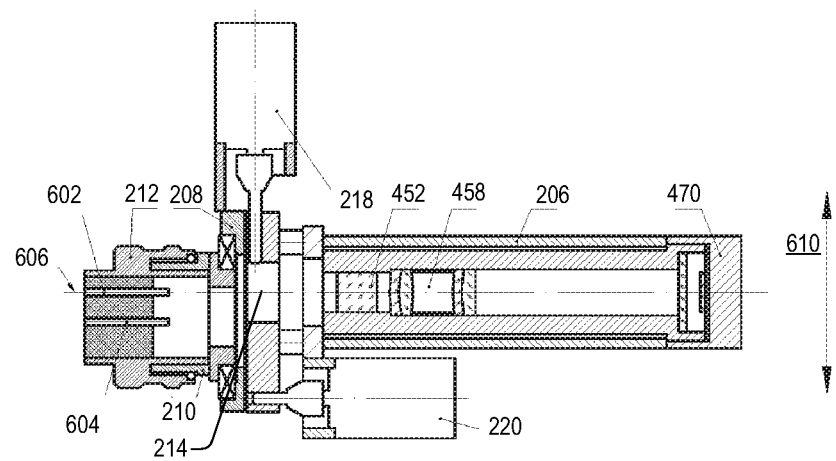
FIG. 6 illustrates a cross-sectional view in the Y-Z plane of the exemplary interferometric inspection system illustrated in FIG. 2 in a third position.
Figure 7:
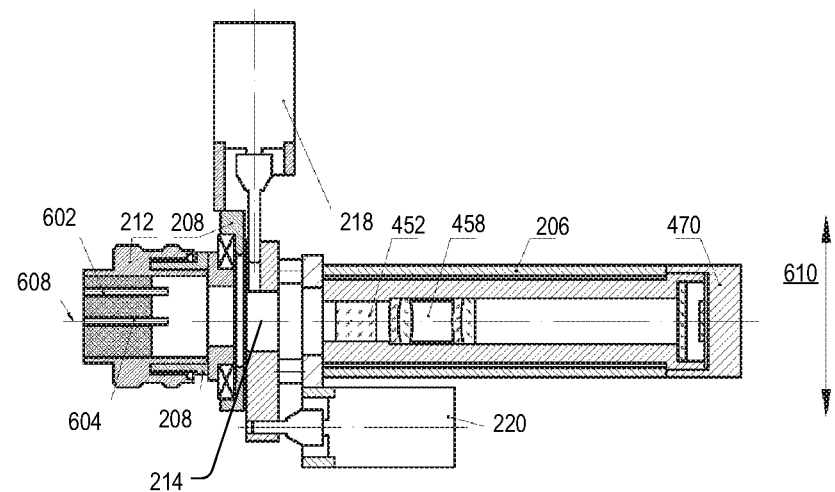
FIG. 7 illustrates a cross-sectional view in the Y-Z plane of the exemplary interferometric inspection system illustrated in FIG. 2 in a fourth position.

FIGS. 6 and 7 illustrate cross-sectional views in the Y-Z plane of the exemplary interferometric inspection system 200 illustrated in FIG. 2 when positioned in third and fourth positions to scan different optic fibers 602 and 604. As may be seen in FIG. 6, the motion mechanism 208 is positioned to scan the end face center of fiber 602, whereas in FIG. 7 the mechanism is positioned to scan the end face center of another fiber 604. In FIG. 6, the center axis 606 of fiber 602 is aligned with the optical axis 214. After repositioning, the optical axis 214 of interferometer 206 is aligned with the center axis 608 of the other fiber 604.

Figure 8:
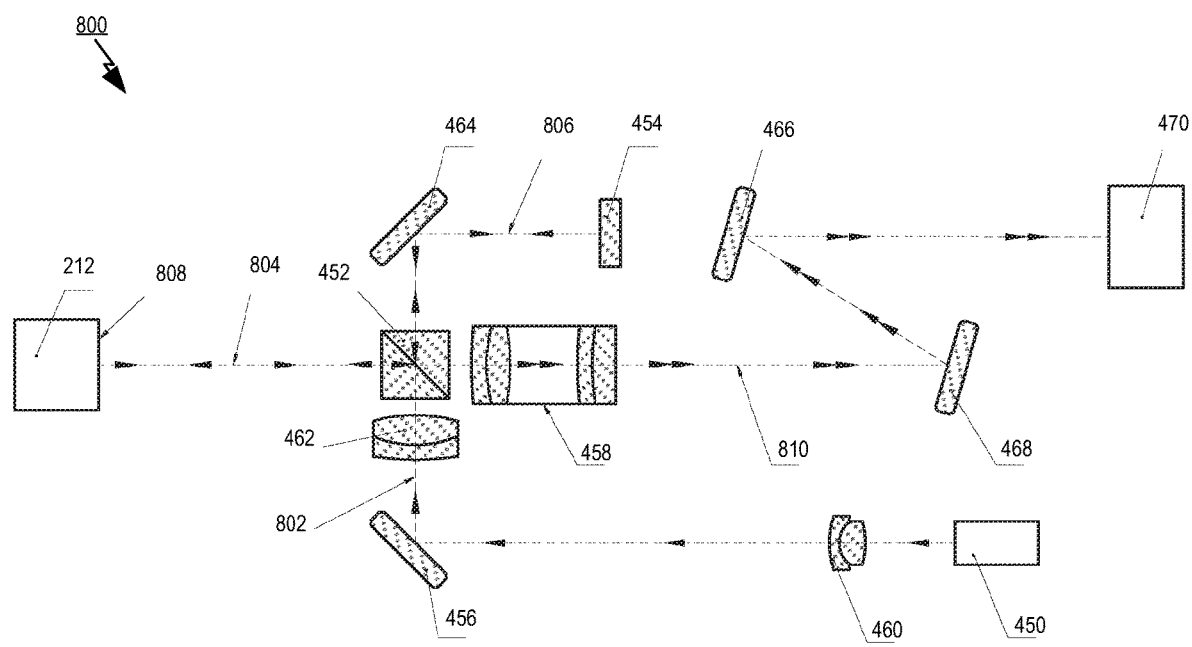
FIG. 8 is a schematic representation of the optic system of the interferometer.

FIG. 8 is a schematic representation of one example of how the optical system 800 of the interferometer 206 may be configured. As shown, the optical system of the interferometer 206 may contains a series of mirror elements 456, 464, 466, and 468, which afford a smaller system that moves toward miniaturization or compactness of the system 200. This optical system 800 ensures smaller overall dimensions of the device and reduces the weight of the system as well. Such compactness affords easy transportation and easier in situ inspection of multi-channel fiber optic connectors on patch-panels, server boxes and other optical-network devices, as examples. Additionally, the light source 450 may be a light emitting diode (LED) or any other light source capable of providing appropriate light illumination. Use of LEDs, however, provides further compactness and reduced weight over other conventional light sources.

The beam splitter 452 is an optical element that divides an incoming beam of light 802 from light source 450 into two beams 804 and 806. The beam splitter 452 can be a cubic optical component that consists of two prisms in one example. In another aspect the beam splitter 452 may be configured as a transparent plate with partially reflective coating for beam splitting.

One optic path 806 travels to the reference mirror 454. The other optic path 804 travels to a surface 808, which may be the end face of the connector 212 mounted into the holding fixture 210. These two paths 804 and 806 are similar. In particular, the beam of light 802 from the light source 450 travels to the beam splitter 452 and is divided into beam 804 and beam 806. The beam 804 reflects the surface of inspected object 808 and returns this reflected light to the beam splitter 452 via the same path as beam 804. Beam 806, on the other hand, is reflected off the reference mirror 454 and returns the reflected light to the beam splitter 452 by the similar optic path 806. At the beam splitter 452, the reflected beams 804 and 806 interfere and propagate out of the splitter 452 as beam 810, which represents interference patterns with constructive or destructive interference of beams 804 and 806. Lens 458 provides magnification of the resulting interference image and projects the beam 810 via mirrors 466 and 468 to the digital camera 470 for image capture.

Figure 9:
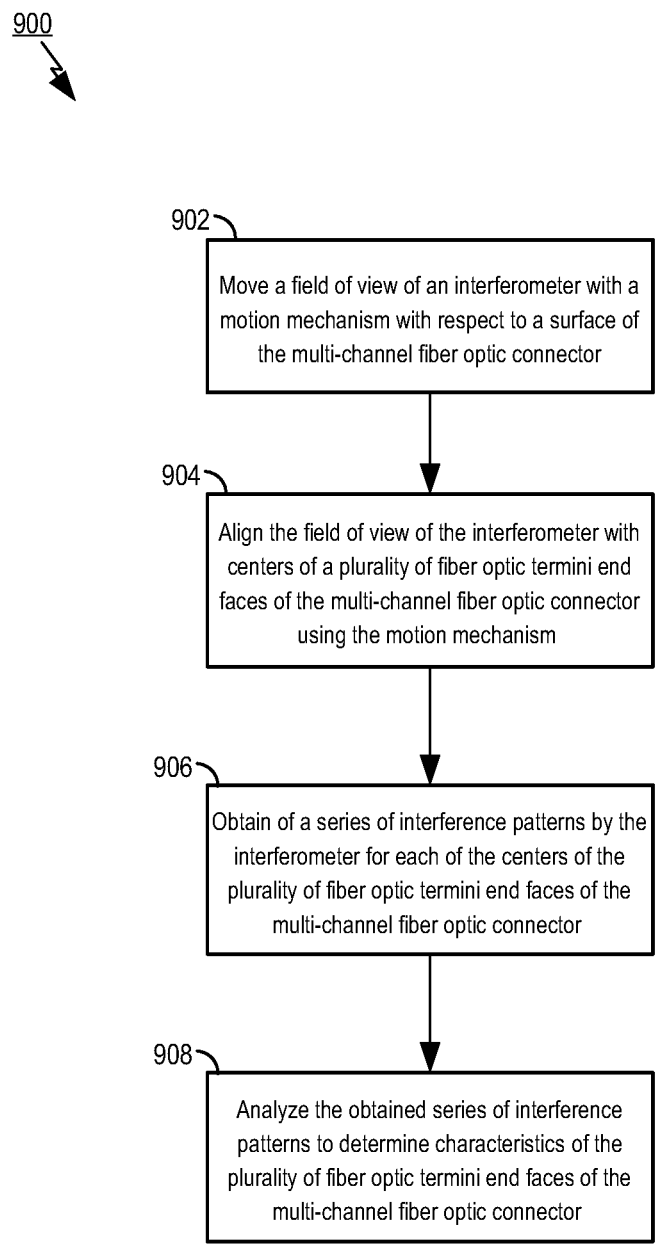
FIG. 9 illustrates a method for interferometric inspection using the disclosed interferometric inspection systems.

FIG. 9 illustrates an exemplary method 900 for interferometric inspection of a multi-channel fiber optic connector using the disclosed interferometric systems. As illustrated in block 902, the method 900 includes moving a field of view of an interferometer with a motion mechanism with respect to a surface of the multi-channel fiber optic connector. Further, method 900 includes aligning the field of view of the interferometer with centers of a plurality of fiber optic termini end faces of the multi-channel fiber optic connector using the motion mechanism as shown at block 904.

Additionally, method 900 includes obtaining of a series of interference patterns by the interferometer for each of the end face centers of the plurality of fiber optic termini of the multi-channel fiber optic connector as shown in block 906. Finally, method 900 includes analyzing the obtained series of interference patterns to determine characteristics of fiber optic termini of the multi-channel fiber optic connector as shown at block 908.

According to further aspects, method 900 includes that the determined characteristics includes detection of particles, stains, and surface anomalies of the fiber optic termini, including calculated size and height values of the surface anomalies. Additionally, the motion mechanism used in method 900 provides at least two axis positioning of the interferometer configured to align each fiber optic terminus end face in the connector with a field of view of the interferometer by moving the interferometer in a plane perpendicular to the optical axis of the interferometer.

It is also noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, certain embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An interferometric system for inspection of a multi-terminus fiber optic connector, the system comprising:
   an interferometer configured to perform interferometric inspection of the multi-terminus fiber optic connector and collect interferometric data concerning an end face of the multi-terminus fiber optic connector;
   a holding fixture configured to hold the fiber optic connector; and
   a motion mechanism that is removably couplable to the holding fixture and configured to position one or more multiple termini of the multi-terminus fiber optic connector with respect to the interferometer in at least one of three Cartesian X, Y, and Z axes and configured for in situ inspection of the multi-terminus fiber optic connector.

2. The interferometric system of claim 1, further comprising at least one computation circuitry communicatively coupled to the interferometer and configured to:
   (a) control the motion mechanism either dependent on the interferometric data or independent of the interferometric data;
   (b) perform an analysis of interference patterns received from the interferometer;
   (c) determine a reconstruction of the three dimensional surface of at least one fiber optic terminus in the multi-terminus fiber optic connector; and
   (d) calculate parameters of the at least one fiber optic terminus of the multi-terminus fiber optic connector based on the determined reconstruction of the three dimensional surface of the at least one fiber optic terminus, the parameters including one or more of a ferrule or fiber radius of curvature, a ferrule or fiber apex offset, and a fiber height of at least one fiber optic terminus in the connector.

3. The interferometric system of claim 1, wherein the motion mechanism further comprises at least one motive driver configured to move the interferometer in at least one direction of the at least one of three Cartesian X, Y, and Z axes.

4. The interferometric system of claim 1, wherein the motion mechanism further comprises a plurality of stepper motor devices each configured to a move the interferometer in a respective axis of motion parallel to at least one of the at least three Cartesian X, Y, and Z axes.

5. The interferometric system of claim 1, wherein the motion mechanism includes at least one motive driver disposed with the interferometer to focus the interferometer on at least one fiber optic terminus end face of the multi-terminus fiber optic connector.

6. The motion mechanism of claim 3, wherein the at least one motive driver is one of a stepper motor or a piezoelectric mechanism.

7. The interferometric system of claim 1, wherein the interferometer further comprises:
   at least one light source;
   at least one beam splitter configured to receive a beam of light from the light source and split the beam into two output beams of light each respectively directed by the splitter to a surface of the multi-terminus fiber optic connector and at least one reference mirror element;
   at least one magnifying lens element; and
   at least one digital camera configured to receive the interferometric information including interference patterns from the at least one beam splitter and the at least one magnifying lens element.

8. The interferometric system of claim 7, further comprising a plurality of mirror elements, wherein the configuration of the interferometer through the use of the plurality of mirror elements comprises a miniaturized, lightweight interferometric microscope to provide small overall dimensions and weight of the interferometer for in situ inspection of the connector.

9. The interferometric system of claim 1, wherein the holding fixture is configured to connect the interferometer to a circular multi-terminus fiber optic connector with at least one fiber optic terminus.

10. A method of inspection of a multi-terminus fiber optic connector using an interferometric system including an interferometer configured to perform interferometric inspection of the connector and collect interferometric data concerning the fiber optic connector end face, a holding fixture configured to hold the multi-terminus fiber optic connector, and a motion mechanism that is removably couplable to the holding fixture and configured to align a field of view of the interferometer with respect to multiple termini of the multi-terminus fiber optic connector in at least one of three Cartesian X, Y, and Z axes and for in situ inspection of the multi-terminus fiber optic connector, the method comprising:

moving the field of view of the interferometer with respect to a surface of the multi-terminus fiber optic connector using the motion mechanism;

aligning the field of view of the interferometer with end face centers of a plurality of fiber optic termini of the multi-terminus fiber optic connector using the motion mechanism;

obtaining of a series of interference patterns by the interferometer for each of the end face centers of the plurality of fiber optic termini of the multi-terminus fiber optic connector; and analyzing the obtained series of interference patterns to determine characteristics of each fiber optic termini of the multi-terminus fiber optic connector, including detection of particles, stains, and surface anomalies of the fiber optic termini, and calculation of size and height values of the surface anomalies.

11. The method of claim 10, wherein the motion mechanism provides at least two axis positioning of the interferometer configured to align a field of view of the interferometer with each fiber optic terminus end face in the multi-terminus fiber optic connector by moving the interferometer in a plane perpendicular to the optical axis of the interferometer.

\* \* \* \* \*